US005777002A

United States Patent [19]
Conway et al.

[11] Patent Number: 5,777,002
[45] Date of Patent: Jul. 7, 1998

[54] METHOD FOR PREPARING ORGANOPOLYSILOXANE BASES AND COMPOSITIONS THEREFROM

[75] Inventors: Lori Jean Conway; Thomas Edward Gray; Phillip Joseph Griffith; William James Schulz, Jr., all of Midland, Mich.

[73] Assignee: Dow Corning Corporation, Midland, Mich.

[21] Appl. No.: 748,435

[22] Filed: Nov. 13, 1996

Related U.S. Application Data

[63] Continuation-in-part of Ser. No. 542,206, Oct. 12, 1995, abandoned, which is a continuation-in-part of Ser. No. 272,502, Jul. 8, 1994, abandoned.

[51] Int. Cl.$^6$ ........................ C08K 9/06
[52] U.S. Cl. .............. 523/213; 523/209; 523/210; 106/287.14; 106/287.15; 106/431; 524/731; 524/847; 524/860
[58] Field of Search .............. 106/287.14, 287.15, 106/431; 523/210, 213, 209; 524/731, 847, 860

[56] References Cited

U.S. PATENT DOCUMENTS 4,013,611  3/1977  Hechtl et al. .................. 260/37 SB
4,116,919  9/1978  Elias et al. .................... 260/37 SB
4,360,610  11/1982  Murray et al. .................. 523/212

*Primary Examiner*—Karen A. Dean
*Attorney, Agent, or Firm*—Jennifer S. Warren; William F. Boley

[57] ABSTRACT

A method for preparing organopolysiloxane bases with high levels of fillers. The present inventors have found that by mixing the components of the base at a temperature below about 60° C. for a period of time sufficient to effect essentially a homogeneous blend, a base composition is formed which can be further blended with a platinum group metal-containing catalyst, an organohydrogensiloxane, and optionally an inhibitor to form a curable liquid silicone rubber (LSR) composition. The curable LSR composition has improved flow characteristics and improved shelf life when compared to similar materials where the base is prepared at temperatures above about 60° C. The improved flow characteristics allows larger quantities of fillers to be incorporated into the curable LSR composition while still maintaining acceptable flow characteristics. Silicone elastomers prepared using the curable LSR compositions can have improved swell and degradation resistance to oils, lower compression set values, and improved tear, elongation, and tensile values and require no post cure. The present organopolysiloxane bases are particularly useful as a common base for forming a group of cured silicone elastomers with a range of durometers.

15 Claims, No Drawings

METHOD FOR PREPARING ORGANOPOLYSILOXANE BASES AND COMPOSITIONS THEREFROM

This application is a continuation-in-part of application Ser. No. 08/542,206, filed Oct. 12, 1995, now abandoned, which is a continuation-in-part of application Ser. No. 08/272,502 filed Jul. 8, 1994, now abandoned for which the following is a specification.

BACKGROUND OF INVENTION

The present invention is a method for preparing organopolysiloxane bases with high levels of fillers. The present inventors have found that by mixing the components of the base at a temperature below about 60° C. for a period of time sufficient to effect essentially a homogeneous blend, a base composition is formed which can be further blended with a platinum group metal-containing catalyst, an organohydrogensiloxane, and optionally an inhibitor to form a curable liquid silicone rubber (LSR) composition. The curable LSR composition has improved flow characteristics and improved shelf life when compared to similar materials where the base is prepared at temperatures above about 60° C. The improved flow characteristics allows larger quantities of fillers to be incorporated into the curable LSR composition while still maintaining acceptable flow characteristics. The present organopolysiloxane bases are particularly useful as a common base for forming a group of cured silicone elastomers with a range of durometers.

Silicone elastomers prepared using the curable LSR compositions can have improved swell and degradation resistance to oils and lower compression set values. In addition, the silicone elastomers may have better tear, elongation, and tensile values and require no post cure.

The platinum catalyzed crosslinking of olefin containing polysiloxanes with polysiloxanes containing hydrogen-bonded silicon to form silicone elastomers is well known in the art. It is also known that the physical properties of these silicone elastomers can be modified by the addition of reinforcing fillers such as silica and extending fillers such as ground quartz. A common problem associated with the incorporation of such reinforcing and extending fillers into liquid polysiloxane compositions is a significant increase in viscosity. This increase in viscosity often presents a dilemma to formulators and fabricators making and using such materials. On one hand higher levels of fillers can provide for improved physical characteristics such as physical strength and oil resistance, but on the other hand the incorporation of the higher level of fillers can result in a material having such a high viscosity that it cannot be used in processes such as low-pressure and high-pressure injecting molding.

Many procedures are described in the art for the treatment of such fillers to improve or modify their effect on the physical properties of silicone elastomers. For example, Elias et al., U.S. Pat. No. 4,116,919 describe a process for treating reinforcing silica using various disilazanes and an amine. Elias et al. report that the treatment allows production of an easily extrudable composition with improved durometer and tear strength. The method described by Elias et al. and many similar methods for treating such fillers reported in the art appear not to consider the increase in viscosity of liquid polysiloxane mixtures that can occur upon the addition of ground quartz.

Murry et al., U.S. Pat. No. 4,360,610, describe using elevated temperatures to make a vinylorganopolysiloxane composition more compatible with an extending filler such as ground quartz. Murry et al. disclose a composition where a vinylorganopolysiloxane gum, a reinforcing filler, and a portion of a hydroxylated organosilicone compound is heated at a temperature of 60° C. to 250° C. for a period of time from 10 minutes to 10 days to provide a product that is stable upon storage. Murry et al. report that when the temperature is reduced below 125° C. additional hydroxylated organosilicone compound and from one to 250 parts by weight of extending filler is added to the composition. When this composition is cured using a peroxide catalyst it is reported to have improved tensile strength. No mention is made of the effect of the process on viscosity of the composition after addition of the extending filler or of the shelf life of the composition.

Hechtl et al., U.S. Pat. No. 4,013,611, teaches that in some instances the order and method of addition of a filler with polysiloxane components can influence the effect of the filler on the resulting filled polysiloxane composition. Hechtl et al. teach that compositions containing ten to 50 weight percent filler can be pourable or capable of being brushed onto a substrate.

The present inventors have found that a vinyldiorganosiloxy end-terminated polysiloxane fluid having a viscosity within a range of about 30 mPa.s to 1,000 mPa.s can be mixed at a temperature below about 60° C. with a disilazane, silica reinforcing filler, ground quartz, and water to form a base composition having lower viscosity and improved shelf life, when compared to similar compositions prepared at temperatures above about 60° C.

SUMMARY OF INVENTION

The present invention is a method for preparing organopolysiloxane bases with high levels of fillers. The present inventors have found that by mixing the components of the base at a temperature below about 60° C. for a period of time sufficient to effect essentially a homogeneous blend, a base composition is formed which can be further blended with a platinum group metal-containing catalyst, an organohydrogensiloxane, and optionally an inhibitor to form a curable liquid silicone rubber (LSR) composition. The curable LSR composition has improved flow characteristics and improved shelf life when compared to similar materials where the base is prepared at temperatures above about 60° C. The improved flow characteristics allow larger quantities of fillers to be incorporated into the curable LSR composition while still maintaining acceptable flow characteristics. Silicone elastomers prepared using the curable LSR compositions can have improved swell and degradation resistance to oils, lower compression set values, and improved tear, elongation, and tensile values and require no post cure. The present organopolysiloxane bases are particularly useful as a common base for forming a group of cured silicone elastomers with a range of durometers.

DESCRIPTION OF INVENTION

The present invention is a method for preparing an organopolysiloxane base, which when blended with suitable curing components forms a composition having improved flow characteristics and shelf life. The present invention is also novel organopolysiloxanes bases prepared by the method, liquid silicone rubber (LSR) compositions containing the organopolysiloxane base and suitable curing components, and cured silicone rubber compositions having a wide range of durometers prepared from the LSR compositions.

The method for preparing the organopolysiloxane base (hereinafter referred to as component (A)) comprises, forming a mixture comprising:

(i) 100 parts by weight of a vinyldiorganosiloxy end-terminated polysiloxane fluid having a viscosity within a range of about 30 mPa.s to 1,000 mpa.s at 25° C., (ii) 40 parts to 120 parts by weight of ground quartz having an average particle size within a range of about one to 20 microns, (iii) up to about 50 parts by weight of silica (iv) five parts to 20 parts by weight of a disilazane, and (v) about one to ten parts water;

where components (A)(i) through (A)(v) are mixed at a temperature below about 60° C. for a period of time sufficient to effect silation of the ground quartz and the silica by hydrolysis product of the disilazane.

Optionally, the organopolysiloxane base (A) can further comprise: (vi) 0.05 parts to 5 parts by weight of a hydroxydiorganosiloxy end-terminated vinylorganosiloxane described by formula HO{(SiR$_2$O)$_x$(SiRViO)$_y$}H where each R is an independently selected non-alkenyl monovalent hydrocarbon radical comprising one to about seven carbon atoms, Vi is vinyl, x+y=6 to 20 and y≧2.

The organopolysiloxane base can be further mixed with:

(B) an organohydrogensiloxane crosslinker containing an average of at least two silicon-bonded hydrogen atoms per molecule, the amounts of components (B) and (A)(i) being sufficient to provide a ratio of the number of silicon-bonded hydrogen atoms to the number of vinyl substituents of component (A)(i) within a range of 1:10 to 10:1, and (C) a platinum group metal-containing catalyst, the amount of catalyst being sufficient to accelerate a curing reaction between the vinyl substituents of component (A)(i) and the silicon-bonded hydrogen atoms of component (B).

The mixture comprising the organopolysiloxane base (A), organohydrogensiloxane crosslinker (B), and platinum group metal-containing catalyst (C) can further comprise an inhibitor (D) that retards the room temperature curing of the mixture.

The mixture comprising the organopolysiloxane base (A), the organohydrogensiloxane crosslinker (B), and the platinum group metal-containing catalyst (C) and optionally the inhibitor (D) can be cured at an appropriate temperature to form a silicone elastomer.

The mixing of components comprising the organopolysiloxane base can be effected in any standard mixer for creating such mixture, providing the temperature of components within the reactor are kept at a temperature below about 60° C. The mixer can be for, example, a water-cooled Baker Perkins type mixer.

The vinyldiorganosiloxy end-terminated polysiloxane fluid (A)(i) can have a viscosity within a range of about 30 mPa.s to 1,000 mPa.s at 25° C. (30 to 1,000 centipoise). The vinyldiorganosiloxy end-terminated polysiloxane fluid can be monodispersed, polydispersed, or a mixture of monodispersed fluids. Preferred is when the vinyldiorganosiloxy end-terminated polysiloxane fluid has a viscosity within a range of about 40 mPa.s to 500 mPa.s at 25° C. In addition to the vinyl substituents, the polysiloxane fluid (A)(i) also comprises organic substituents bonded to silicon where each organic substituent can be an independently selected monovalent hydrocarbon radical comprising one to seven carbon atoms, with the proviso that at least 50 percent of the organic substituents be methyl.

The organic substituents of polysiloxane fluid (A)(i) can be, for example, alkyls such as methyl, ethyl, propyl, tertiary butyl, and hexyl; cycloalkyls such as cyclohexyl; aryls such as phenyl and tolyl; and halogen substituted alkyls such as 3,3,3-trifluoropropyl and perfluoropropyl. Preferred is when all the organic non-vinyl substituents are methyl.

The organopolysiloxane base can comprise about 40 to 120 parts by weight of ground quartz having an average particle size within a range of about one micron to 20 microns. Preferred is when the organopolysiloxane base comprises about 80 to 120 parts by weight of ground quartz having an average particle size within a range of about one micron to 20 microns. Even more preferred is when the ground quartz comprises about 100 parts to 110 parts by weight per 100 parts by weight of the vinyldiorganosiloxy end-terminated polysiloxane fluid (A)(i). Preferred is when the ground quartz has an average particle size within a range of about one micron to 10 microns. More preferred is when the ground quartz has an average particle size of about five microns.

The organopolysiloxane base comprises up to about 50 parts of silica reinforcing filler per 100 parts by weight of the vinyldiorganosiloxy end-terminated polysiloxane fluid (A) (i). Preferred is when the organopolysiloxane base comprises about 30 to 40 parts by weight of silica reinforcing filler, on the same basis. Both precipitated and fumed silica can be used, however fumed silica is preferred. It is preferred that the silica reinforcing filler have a surface area greater than about 50 m$^2$/g. The preferred silica filler is a fumed silica have a surface area within a range of about 300 m$^2$/g to 500 m$^2$/g.

The organopolysiloxane base comprises five parts to 20 parts by weight of a disilazane per 100 weight parts of the vinyldiorganosiloxy end-terminated polysiloxane fluid (A) (i). The disilazane can be of formula (R$^1_3$Si)$_2$NH, where R$^1$ is selected from a group consisting of R as described herein and alkenyls comprising two to about seven carbon atoms. Preferred is when each R$^1$ is independently selected from a group consisting of methyl and vinyl. The disilazanes can be prepared by the procedures of Ismail et al., U.S. Pat. No. 3,481,964, hereby incorporated by reference, by combining the corresponding halosilane with ammonia. The disilazane can comprise a mixture of disilazanes. Preferred is when about seven to 15 parts by weight of the disilazane is added on the same basis as described above. Even more preferred is when about 12 parts by weight of hexamethyldisilazane is added on the same basis as described above.

Preparation of the organopolysiloxane base requires the presence of about one to ten parts by weight water, per 100 parts by weight of the vinyldiorganosiloxy end-terminated polysiloxane fluid (A)(i). Preferred is the presence of about two to seven parts by weight of water, on the same basis. Those skilled in the art will recognize that water associated with the ground quartz (A)(ii) and silica (A)(iii) can provide at least a portion of the water requirement to the process. Additional water, such as de-ionized or distilled water, can be added to the process as required.

Optionally, organopolysiloxane base (A) can further comprise 0.05 to ten parts by weight of hydroxydiorganosiloxy end-terminated vinylorganosiloxane (A)(vi) described by formula HO{(SiR$_2$O)$_x$(SiRViO)$_y$}H, where Vi is vinyl, each R is an independently selected non-alkenyl monovalent hydrocarbon radical comprising one to about 7 carbon atoms, x+y=6 to 20, and y equals two to twenty. Preferred is when the hydroxydiorganosiloxy end-terminated vinylorganosiloxane comprises about one to five parts by weight per 100 parts by weight of the vinyldiorganosiloxy end-terminated polysiloxane fluid (A)(i). The substituent R can be, for example, alkyls such as methyl, ethyl, propyl, tertiary butyl, and hexyl; cycloalkyls such as cyclohexyl; aryls such as phenyl and tolyl; and halogen substituted alkyls such as 3,3,3-trifluoropropyl and perfluoropropyl. Preferred is when the substituent R is methyl.

The organopolysiloxane base comprising the above described components (A)(i) through (A)(v) and optionally (A)(vi) is mixed at a temperature below about 60° C. for a period of time sufficient to effect essentially a homogeneous blend and to effect silation of the ground quartz and the silica by hydrolysis product of the disilazane. By the term "essentially homogeneous blend" it is meant until the mixture appears uniform by unaided visual inspection. The present inventors have discovered that if during this mixing process the temperature of the mixture comprising components (A)(i) through (A)(v) and optionally (A)(vi) is kept below about 60° C. the resulting base will have better flow characteristics (i.e. lower viscosity) and improved shelf life, when compared to a similar base with comparable filler levels prepared at higher temperatures. Therefore, higher levels of filler can be incorporated into the base while maintaining flow characteristics typical of those associated with liquid silicone rubber compositions (LSR). Organopolysiloxane bases prepared by the present process typically have viscosities within the range of about 1,000 Pa.s at 10 sec$^{-1}$ (0.067×10$^6$ centistoke) to 25,000 Pa.s at 0.9 Sec$^{-1}$ (1.68×10$^6$ centistoke).

The specific apparatus for effecting mixing is not critical to the present process and can be any mixing apparatus where the contents of the mixture can be kept below a temperature of about 60° C. during the mixing process. The mixing apparatus can be, for example, a water cooled sigma blade mixer or a water cooled bread dough mixer.

In a preferred embodiment of the present method the mixture comprising components (A)(i) through (A)(v) and optionally (A)(vi) is prepared at a temperature within a range of about 50° C. to 60° C. by incremental addition of certain of components (A)(i) through (A)(v) and optionally (A)(vi) to the mixing apparatus. For example, about 50 to 75 weight percent of component (A)(i) can be added to the mixing apparatus, about 50 weight percent of component (A)(iv), and all of components (A)(v) and (A)(vi) to form a liquid mixture. At least 75 weight percent of the ground quartz (A)(ii) can be added to this liquid mixture along with about one-third of the silica (A)(iii). The components are mixed for a period of time sufficient to ensure essentially a homogeneous blend. The remaining components, that is the silica (A)(iii) and disilazane (A)(iv) are added in two more approximately equal increments with additional mixing in between each addition. This mixture is then heated at a temperature within a range of about 140° C. to 160° C. under vacuum until a characteristic ammonia odor is undetectable. The mixture is cooled to a temperature within a range of 50° C. to 60° C. and the remainder of components (A)(i) and (A)(ii) added to form the organopolysiloxane base material of the present invention.

A preferred sequence of addition of components to form organopolysiloxane base (A) is as follows: a mixture comprising (A)(i), (A)(v), and optionally A(vi) is formed; (A)(iv) is added to the mixture and blended in; (A)(ii) is then added to the mixture and blended in; finally, (A)(iii) is added to the mixture and blended in and the resulting mixture is heated as described above.

The organopolysiloxane base material of the present invention can be further mixed with organohydrogensiloxane (B) crosslinker, platinum group metal-containing catalyst (C), and optionally inhibitor (D) to form a curable liquid silicone rubber composition.

The organohydrogensiloxane (B) crosslinker contains an average of at least two silicon-bonded hydrogen atoms per molecule and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbons radicals can be, for example, alkyls such as methyl, ethyl, propyl, tertiary butyl, and hexyl; cycloalkyls such as cyclohexyl; aryls such as phenyl and tolyl; and halogen substituted alkyls such as 3,3,3-trifluoropropyl and perfluoropropyl. Preferred is when all of the monovalent hydrocarbon radicals are methyl. Examples of organohydrogensiloxanes which may be useful as crosslinkers in the present composition are described in Lee et al., U.S. Pat. No. 3,989,668, which is incorporated herein by reference. The organohydrogensiloxane (B) crosslinker can be linear, cyclic, or branched siloxane polymers or mixtures thereof.

The amount of organohydrogensiloxane (B) crosslinker useful in the present composition is that sufficient to provide a ratio where the amount of silicon-bonded hydrogen atoms of component (B) to the number of vinyl substituents of the vinyldiorganosiloxy end-terminated siloxane fluid (A)(i) is within a range of 1:10 to 10:1. Preferred is where the ratio of silicon-bonded hydrogen atoms of component (B) to vinyl substituents of component (A)(i) is within a range of about 1:1 to 5:1. More preferred is where the ratio of silicon-bonded hydrogen atoms of component (B) to vinyl substituents of component (A)(i) is within a range of about 1:1 to 3:1. It is preferred that the organohydrogensiloxane (B) crosslinker comprise about 0.005 to 10 weight percent Si-H. More preferred is when the organohydrogensiloxane (B) crosslinker comprises about 0.05 to 2 weight percent Si-H.

The platinum group metal-containing catalyst can be any such catalyst which is known to catalyze the reaction of silicon-bonded hydrogen atoms with silicon-bonded vinyl groups. By "platinum group metal" it is meant ruthenium, rhodium, palladium, osmium, iridium, and platinum. A group of platinum group metal-containing catalysts particularly useful in the present composition are the complexes prepared from chloroplatinic acid as described by Willing, U.S. Pat. No. 3,419,593, which is hereby incorporated by reference to show such complexes and their preparation. A preferred catalyst is a platinum-containing complex which is the reaction product of chloroplatinic acid and sym-divinyltetramethyldisiloxane. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation.

The amount of platinum group metal-containing catalyst that can be used to effect curing of the present LSR composition is not narrowly limited as long as there is a sufficient amount to accelerate a reaction between the silicon-bonded hydrogen atoms of the organohydrogensiloxane (B) crosslinker and the vinyl radicals of the vinyldiorganosiloxy end-terminated polysiloxane fluid (A)(i).

The appropriate amount of the platinum group metal-containing catalyst will depend upon the particular catalyst used. In general as low as about 0.001 part by weight of platinum group metal for every one million parts (ppm) by weight of component (A)(i) may be useful. Preferably the amount of platinum group metal is at least 1.0 ppm, on the same basis. More preferred is 1.0 ppm to about 10,000 ppm of platinum group metal, on the same basis.

The organopolysiloxane base containing crosslinker and catalyst will cure rapidly at room temperature. To hinder this curing process an inhibitor (D) may be added to the composition. The inhibitor can be any of those materials known to inhibit the catalytic activity of platinum group metal-containing catalyst. By the term "inhibitor" it is meant a material that retards the room temperature curing of the composition when incorporated in the composition at less than about 10 weight percent of the composition, without preventing the elevated temperature curing of the composition.

Inhibitors for platinum group metal-containing catalyst are well known in the organosilicon art. A preferred class of inhibitors useful in the present composition are acetylenic alcohols as described in Kookootsedes et al., U.S. Pat. No. 3,445,420, which is incorporated herein by reference. Such acetylenic alcohols are exemplified by ethynylcyclohexanol and methylbutynol. Other examples of classes of inhibitors which may be useful in the present process are described in Chung et al., U.S. Pat. No. 5,036,117 which is incorporated herein by reference.

The amount of inhibitor (D) useful in the present composition is not known to be critical and can be any amount that will retard the platinum group metal-containing catalyst catalyzed reaction of the silicon-bonded hydrogen atoms of the crosslinker with the vinyl radicals of component (A)(i), while not preventing the reaction at elevated temperatures. The specific amount of inhibitor (D) to be used will depend upon the particular inhibitor used, the concentration and type of catalyst, and the nature and amounts of component (A)(i) and organohydrogensiloxane (B) crosslinker. Generally, it is preferred that at least one mole of inhibitor be present for each mole of platinum in the composition and that the inhibitor not exceed one weight percent of the composition.

The organopolysiloxane base of the present invention can be used as a common base for forming cured silicone elastomers having durometers within a range of about 20 to 80 durometer points as determined by ASTM Standard D2240. Preferred is when the organopolysiloxane base of the present invention is used as a common base for forming cured silicone elastomers having durometers within a range of about 40 to 70 durometer points as determined by ASTM Standard D2240. The present inventors have found that the durometer of the cured silicone elastomer formed from the present organopolysiloxane base can readily be adjusted by varing the amount of ground quartz and/or silica added to the base within the defined limits and/or varying the ratio of silicon-bonded hydrogen atoms contained in the crosslinker to the number of vinyl substituents of the vinyldiorganosiloxy end-terminated siloxane fluid (A)(i) and varying the weight percent of Si-H in the crosslinker. Preferred is when the ratio of silicon-bonded hydrogen atoms contained in the crosslinker to the number of vinyl substituents of the vinyldiorganosiloxy end-terminated siloxane fluid (A)(i) is maintained within the preferred range as described herein and the other described parameters varied within their described ranges to control the durometer of the cured silicone elastomer.

The curable liquid silicone rubber compositions of the present invention can also contain other components such as mold release agents, pigments, and thermal stabilizing additives.

The liquid silicone rubber composition of the present invention can be formed into a two-part system which can cure upon mixing and being subjected to an appropriate temperature. For example, two equal portions of the organopolysiloxane base (A) can be formed with one portion containing the platinum group metal-containing catalyst and a second portion containing an organohydrogensiloxane crosslinker and optionally an inhibitor. These components can have improved shelf-life when compared to similar compositions in which the organopolysiloxane base was prepared at temperatures above about 60° C.

The liquid silicone rubber composition can be cured to form a silicone elastomer. By the term "cured" it is meant a reaction is effected between the vinyl substituents of component (A)(i) and the silicon-bonded hydrogen atoms of the organohydrogensiloxane (B) crosslinker to convert the LSR composition into a solid. The present composition has the characteristics of a liquid silicone rubber and is particularly useful in injection molding processes for forming shaped objects of silicone rubber. Cured silicone rubber forms prepared from the present composition can have good resistance to swelling and degradation in oils, lower compression set, and improved tear, elongation and tensile values. Furthermore, cured silicone rubber forms prepared from the present composition typically do not require post curing.

The following examples are provided to illustrate the present invention. These examples are not intended to limit the scope of the claims herein.

EXAMPLE 1

An organopolysiloxane base was prepared at a temperature below 60° C. and cured samples prepared and tested for physical properties. The organopolysiloxane base (hereafter referred to as base) was prepared in a Baker Perkins mixer. The final composition of the base is described in Table 1.

The base was prepared in a one-gallon Baker Perkins mixer cooled with water to maintain the temperature of the base below 60° C. One-half of component (i), one-third of component (iv), and all of component (v) and (vi) were added to the mixer and mixed for ten minutes. Next three-fourths of component (ii) was added to the mixer and mixing continued for an additional 15 minutes. Then one-third of component (iii) was added to the mixer and mixing continued for an additional five minutes. One-third of each of components (iii) and (iv) was added to the mixer and mixing continued for an additional five minutes. The remaining one-third of each of components (iii) and (iv) were added to the mixer and mixing was continued for an additional 1.5 hours. The mixer was then heated to about 150° C. and mixing continued for 2.5 hours, after which time the mixture was cooled to below 60° C. The remainders of components (i) and (ii) and all of component (vii) were added to the mixture and blended in, to form the base material.

Viscosity of the base material was determined by ASTM Standard D4287 and is reported in Table 2.

The base was divided into two equal parts designated as Part A and Part B. Into part A was mixed about 0.43 weight percent of a platinum-containing complex (27 ppm platinum) which was the reaction product of chloroplatinic acid and sym-divinyltetramethyldisiloxane. Into Part B was mixed 0.07 weight percent of 1-ethynlcyclohexan-2-ol and 1.42 weight percent of a low molecular weight methylhydrogensiloxane having about 1.05 weight percent silicon-bonded hydrogen.

Equal amounts of Part A and Part B were combined on a water cooled three-roll mill. The blended material was transferred to a standard chase for preparing samples suitable for physical properties determinations and cured at 177° C. for 5 minutes. The cured elastomer was then tested by standard test methods as referenced in Table 2.

Samples of the cured elastomer were also post cured at 204° C. for four hours and the physical properties tested. The test methods used and the results are provided in Table 3.

Samples of the cured elastomer were tested for oil resistance according to ASTM D741-79 using ASTM No. 1 oil. The physical properties of the elastomer after exposure to ASTM No. 1 oil for 70 hours at 150° C. are reported in Table 4.

Samples of the cured elastomer were tested for oil resistance according to Japanese Industrial Standard K6310-1975 using JIS No. 3 oil. The physical properties of the elastomer after exposure to JIS No. 3 oil for 70 hours at 150° C. are reported in Table 5.

TABLE 1

| | Parts | Component |
|---|---|---|
| (i) | 100 | vinyldimethylsiloxy end-terminated dimethylpolysiloxane (viscosity 49,500 mPa.s, 49,500 centipoise) |
| (ii) | 104.2 | ground quartz (Minusil, 2-15 micron, U.S. Silica, Millcreek, OK) |
| (iii) | 32.0 | silica (S-17, surface area (BET) 400 M$^2$/g, Cabot Corporation, Tuscola, IL) |
| (iv) | 12.9 | hexamethyldisilazane |
| (v) | 4.1 | water |
| (vi) | 1.8 | hydroxydimethylsiloxy end-terminated vinylmethylsiloxane described by formula HO{(SiMe$_2$O)$_x$(SiMeViO)$_y$}H, where x/y = 2 and x + y = 8 – 10 |
| (vii) | 1.2 | low molecular weight hydroxydimethylsiloxy end-terminated dimethylpolysiloxane |

EXAMPLE 2

For comparison purposes an organopolysiloxane base was prepared of the same composition and by the same procedure as described in Example 1 except the Baker Perkins mixer was not water cooled during preparation of the composition prior to the heating step. This allowed the temperature of the mixer to rise to about 80° C.–90° C. during the initial mixing. The viscosity of this base was determined by the method described in Example 1 and the results are reported in Table 2. The organopolysiloxane base was then used to form a cured silicone elastomer as described in Example 1, the elastomer was tested by standard test methods referenced and Table 2, and the results of this testing are reported in Table 2. The result of post curing and of contact with oils on the physical properties of the elastomer is reported in Tables 3, 4, and 5 as described in Example 1.

EXAMPLE 3

For comparison purposes an organopolysiloxane base was prepared of the same composition and by the same procedure as described in Example 1 except the Baker Perkins mixer was not water cooled during preparation of the composition prior to the heating step and component (ii), Minusil, was not added until after the heating step. The viscosity of this base was determined by the method described in Example 1 and the results are reported in Table 2. The organopolysiloxane base was then used to form a cured silicone elastomer as described in Example 1, the elastomer was tested by standard test methods as referenced in Table 2, and the results of this testing are reported in Table 2. The result of post curing and of contact with oils on the physical properties of the elastomer is reported in Tables 3, 4, and 5 as described in Example 1.

TABLE 2

Physical Properties of Organopolysiloxane Bases and Elastomers Formed Therefrom

| Test Method | Test | Example 1 | Example 2 | Example 3 |
|---|---|---|---|---|
| ASTM D4287 | Viscosity (Pa.s) | | | |
| | @ 0.9 1/s | 11,400 | 26,981 | 29,817 |
| | @ 10 1/s | 800 | 1,485 | 1,912 |
| ASTM D2240 | Durometer (points) | 65 | 63 | 64 |
| ASTM D412 | Tensile (psi) | 949 | 948 | 949 |
| ASTM D412 | % Elongation | 246 | 237 | 216 |
| ASTM D624 | Tear B (Ppi) | 101 | 80 | 76 |
| ASTM D395 | % Compression Set | 16.4 | 25.7 | 30.6 |

TABLE 3

Effect of Post Cure on Physical Properties of Elastomers Formed From Organopolysiloxane Bases

| Test Method | Test | Example 1 | Example 2 | Example 3 |
|---|---|---|---|---|
| ASTM D2240 | Durometer (points) | 66 | 68 | 71 |
| ASTM D412 | Tensile (psi) | 1005 | 958 | 873 |
| ASTM D412 | % Elongation | 229 | 198 | 175 |
| ASTM D624 | Tear B (Ppi) | 88 | 71 | 72 |
| ASTM D395 | % Compression Set | 16.1 | 18.8 | 18.4 |

TABLE 4

Effect of Exposure to ASTM No. 1 Oil on Physical Properties of Elastomers Formed From Organopolysiloxane Bases

| Test Method | Test | Example 1 | Example 2 | Example 3 |
|---|---|---|---|---|
| ASTM D2240 | Durometer (points) | 61 | 60 | 63 |
| ASTM D412 | Tensile (psi) | 1136 | 1069 | 988 |
| ASTM D412 | % Elongation | 234 | 198 | 185 |
| ASTM D471-79 | % Volume Swell | 3.8 | 4.0 | 3.5 |

TABLE 5

Effect of Exposure to JIS No. 3 Oil on Physical Properties of Elastomers Formed From Organopolysiloxane Bases

| Test Method | Test | Example 1 | Example 2 | Example 3 |
|---|---|---|---|---|
| ASTM D2240 | Durometer (points) | 46 | 45 | 39 |
| ASTM D412 | Tensile (psi) | 851 | 716 | 741 |
| ASTM D412 | % Elongation | 238 | 193 | 196 |
| ASTM D471-79 | % Volume Swell | 25.9 | 26.3 | 24.6 |

We claim:
1. A method for preparing an organosiloxane base, the method comprising: forming a mixture comprising
   (i) 100 parts by weight of a vinyldiorganosiloxy end-terminated polysiloxane fluid having a viscosity within a range of about 30 mPa.s to 1,000 mPa.s at 25° C.,
   (ii) 40 parts to 120 parts by weight of ground quartz having an average particle size within a range of about one to 20 microns,
   (iii) up to about 50 parts by weight of silica,
   (iv) five to 20 parts by weight of disilazane, and
   (v) one to ten parts water;
where components (i) through (v) are mixed at a temperature below about 60° C. for a period of time sufficient to effect silation of the ground quartz and the silica by hydrolysis product of the disilazane.

2. A method according to claim 1, where the vinyldiorganosiloxy end-terminated polysiloxane fluid has a viscosity within a range of about 40 mPa.s to 500 mPa.s at 25° C.

3. A method according to claim 1, where organic non-vinyl substituents of the vinyldiorganosiloxy end-terminated polysiloxane fluid are methyl.

4. A method according to claim 1, where the mixture comprises about 100 parts to 110 parts by weight of ground quartz per 100 parts by weight of the vinyldiorganosiloxy end-terminated polysiloxane fluid.

5. A method according to claim 4, where the ground quartz has an average particle size of about five microns.

6. A method according to claim 1, where the mixture comprises about 30 parts to 40 parts by weight of fumed silica per 100 parts by weight of the vinyldiorganosiloxy end-terminated polysiloxane fluid and the fumed silica has a surface area within a range of about 300 $m^2/g$ to 500 $m^2/g$.

7. A method according to claim 1, where the disilazane is described by formula $(R^1{}_3Si)2NH$, where each $R^1$ is independently selected from a group consisting of non-alkenyl monovalent hydrocarbon radicals comprising one to about seven carbon atoms and alkenyls comprising two to about seven carbon atoms.

8. A method according to claim 7, where each $R^1$ is independently selected from a group consisting of methyl and vinyl.

9. A method according to claim 1, where the mixture comprises seven to 15 parts by weight disilazane per 100 parts by weight of the vinyldiorganosiloxy end-terminated polysiloxane fluid and the disilazane is hexamethyldisilazane.

10. A method according to claim 1, where the mixture comprises two to seven parts by weight of water per 100 parts by weight of the vinyldiorganosiloxy end-terminated polysiloxane fluid.

11. A method according to claim 1, where the mixture further comprises:

(vi) 0.05 parts to 5 parts by weight of a hydroxydiorganosiloxy end-terminated vinylorganosiloxane described by formula $HO\{(SiR_2O)_x(SiRViO)_y\}H$ where each R is an independently selected non-alkenyl monovalent hydrocarbon radical comprising one to about seven carbon atoms, Vi is vinyl, x+y=6 to 20 and y=≧2.

12. A method according to claim 11, where the hydroxydiorganosiloxy end-terminated vinylorganosiloxane comprises about one to five parts by weight per 100 parts by weight of the vinyldiorganosiloxy end-terminated polysiloxane fluid and R is methyl.

13. A method according to claim 1, where a mixture comprising (A)(i), (A)(v), and optionally (A)(vi) is formed; (A)(iv) is added to the mixture and blended in; (A)(ii) is then added to the mixture and blended in; and then (A)(iii) is added to the mixture and blended in thereby forming the organopolysiloxane base.

14. A method according to claim 13, where the organopolysiloxane base is heated at a temperature with a range of about 140° C. to 160° C. to effect removal of volatiles from the base.

15. An organopolysiloxane base prepared by the method of claim 1.

* * * * *